US006148049A

United States Patent [19]
Hein

[11] Patent Number: 6,148,049
[45] Date of Patent: Nov. 14, 2000

[54] METHOD FOR SYNCHRONIZATION OF A CLOCK SIGNAL, WHICH CAN BE GENERATED IN A DATA RECEIVING STATION, WITH A CLOCK SIGNAL WHICH IS USED IN A DATA TRANSMISSION STATION

[75] Inventor: Soeren Hein, München, Germany

[73] Assignee: Siemens Aktiengesellschaft, Munich, Germany

[21] Appl. No.: 09/237,696

[22] Filed: Jan. 26, 1999

Related U.S. Application Data

[63] Continuation of application No. PCT/DE97/01566, Jul. 24, 1997.

[30] Foreign Application Priority Data

Jul. 26, 1996 [DE] Germany ............................ 196 30 398

[51] Int. Cl.[7] ................................ H04L 7/00; H04J 3/06; G06F 1/12
[52] U.S. Cl. ............................ 375/354; 370/509; 709/400
[58] Field of Search ..................................... 375/354, 362, 375/363, 371, 373, 377; 370/503, 507, 508, 509, 395; 709/400, 248

[56] References Cited

U.S. PATENT DOCUMENTS

| | | | |
|---|---|---|---|
| 5,550,873 | 8/1996 | Dolev et al. ............................ | 375/354 |
| 5,689,688 | 11/1997 | Strong et al. ............................ | 395/553 |
| 5,790,543 | 8/1998 | Cloutier ................................ | 370/395 |
| 5,896,524 | 4/1999 | Halstead, Jr. et al. .................... | 395/553 |

FOREIGN PATENT DOCUMENTS

0684740A2  11/1995  European Pat. Off. .

OTHER PUBLICATIONS

"Timing and Synchronization Using MPEG–2 Transport Streams", David K. Fibush, SMPTE Journal, Jul. 1996, pp. 395–400.

"Optimal MMSE Gear–shifting Algorithm for the Fast Synchronization of DPLL", Beomsup Kim, IEEE International Symposium on Circuits and Systems, 1993, pp. 172–175.

"Standard Recursive Least–Squares Estimation", 13 XP 003047438, pp. 477 and 478.

"Clock Recovery Circuit Based on Preset Counter", IBM Technical Disclosure Bulletin, vol. 29, No. 2, Jul. 1986, pp. 903 and 904.

*Primary Examiner*—Stephen Chin
*Assistant Examiner*—Albert Park
*Attorney, Agent, or Firm*—Herbert L. Lerner; Laurence A. Greenberg; Werner H. Stemer

[57] ABSTRACT

A method for synchronization of a clock signal, which can be generated in a data receiving station, with a clock signal which is used in a data transmitting station. The synchronization is in each case carried out by evaluating a value and a time of received timemark data which represents a count that is dependent on the clock signal frequency in which the timemark data are transmitted to the data receiving station from the data transmitting station. The described method is distinguished by the fact that a parameter which characterizes the frequency of the clock signal of the data transmitting station is estimated in the data receiving station, at least partially taking into account the respective current timemark data and the previously received timemark data, and by the fact that a clock signal generator, which produces the clock signal to be synchronized, is triggered on the basis of the estimated value obtained in this way.

8 Claims, 5 Drawing Sheets

METHOD FOR SYNCHRONIZATION OF A CLOCK SIGNAL, WHICH CAN BE GENERATED IN A DATA RECEIVING STATION, WITH A CLOCK SIGNAL WHICH IS USED IN A DATA TRANSMISSION STATION

CROSS-REFERENCE TO RELATED APPLICATION

This is a continuation of copending International Application PCT/DE97/01566, filed Jul. 24, 1997, which designated the United States.

BACKGROUND OF THE INVENTION

Field of the Invention

The present invention relates to a method for synchronization of a first clock signal, which can be generated in a data receiving station, with a second clock signal which is used in a data transmitting station. The synchronization is in each case carried out by evaluating a value and a time of timemark data which represent counts that are dependent on the clock signal frequency, which timemark data are transmitted to the data receiving station from the data transmitting station.

Methods of this type are mainly used in digital transmission systems. A practical example will be explained in the following text on the basis of a system operating in accordance with the MPEG-2 Standard.

The MPEG-2 Standard is a compression and transmission standard which is configured in particular for digital video data and which is expected to be or become the most important standard of its type in the coming years. It is already used to a considerable extent in digital television sets, video recorders, etc..

In a system operating in accordance with the MPEG-2 Standard, data are intended to be transmitted from a data transmitting station to a data receiving station. In the data receiving station, the data will be further processed, then a clock signal which is synchronized to a clock signal used in a data transmitting station has to be generated in the data receiving station.

In contrast to analog video systems, where it has been possible to synchronize the data receiving station and the data transmitting station using TV synchronization signals transmitted together with the video data, digital systems require a different procedure, owing to the fact that it is not necessary to transmit the known TV synchronization signals.

In the systems under consideration here, that is to say systems which operate in accordance with the MPEG-2 Standard, the different procedure consists of the data transmitting station transmitting specific timemark data, or so-called time stamps, to the data receiving station from time to time.

The configuration of the data transmitting station and of the data receiving station which needs to be provided for synchronization using time stamps, as well as the generation and the evaluation of the time stamps in the data transmitting station and the data receiving station, respectively, are described in the following text with reference to a practical example.

The clock signal which is intended to be used for synchronization, that is to say the clock signal used by the data transmitting station (for example a coder) is assumed to be a clock signal whose frequency may be 27 MHz. The permissible error from the nominal frequency is assumed to be ±810 Hz, with the maximum permissible drift rate being defined as 0.075 Hz/s. The values thus exactly match the specifications provided by the MPEG-2 Standard.

The clock signal from the data transmitting station is used to trigger a counter which is provided there (in this case a 42-bit counter), in which case the count of the counter is incremented by 1 per clock cycle. The respective current count of the counter is transmitted to the data receiving station (for example a decoder) at specific time intervals. The data, which represent the count that is dependent on the clock signal frequency, are the timemark data or time stamps already mentioned above.

The time intervals at which such time stamps are transmitted differ. In the MPEG-2 Standard, they are a maximum of 100 ms (for the so-called transport stream) or a maximum of 700 ms (for the so-called program stream).

The data receiving station receives the time stamps, in which case the time of reception is in each case that time at which the last bit of the respectively transmitted time stamp is received.

In the data receiving station, the counter count which is represented by a respective time stamp from the data transmitting station is compared with the count which a counter provided in the data receiving station has reached at the time when the time stamp is received.

The counter in the data receiving station counts as a function of the clock signal (for synchronization) generated there. In other words, its count is incremented by 1 per clock cycle of the clock signal generated in the data receiving station.

If and for as long as the comparison of the counts indicates that they are the same or have a constant difference, it may be assumed that the clock signal of the data receiving station and the clock signal of the data transmitting station are at the same frequency and are synchronized. If not, that is to say if the count difference varies and thus indicates inaccurate or faulty synchronization, a clock signal generator which produces the clock signal to be synchronized in the data receiving station is readjusted in order to achieve synchronization again as quickly as possible.

The knowledge and following of the difference between the counts is in general important not just for clock signal synchronization, since the count of the counter in the data receiving station may also be used, inter alia, to set defined reference times and to determine output or passing-on times, which are predetermined by the data transmitting station and are related to the reference times, at which useful data (video and/or audio data) transmitted to the data receiving station must be output or passed on.

If the continual comparisons of the counts to be compared with one another indicate differences which fluctuate frequently and/or considerably, then, in order to achieve more accurate synchronization, the time intervals between the clock signal generator readjustments can be shortened by outputting and evaluating the time stamps more frequently. The maximum possible synchronization errors can be considerably reduced in this way.

However, as is known, the synchronization is also influenced by propagation time fluctuations and by so-called jitter phenomena in the course of data transmission from the data transmitting station to the data receiving station, to be precise, in particular, if this affects the time stamp transmission.

The propagation time fluctuations and jitter phenomena are randomly varying fluctuations of the signal propagation time. Their magnitude depends, inter alia, on the transmission route (satellite, cable, ATM network etc.), and may vary between a few nanoseconds and several milliseconds.

The main irregularities which can be observed when jitter phenomena occur are shown in FIG. 7.

FIG. 7 shows the association between the time of transmission and the time of reception of time stamps which are sent from the data transmitting station to the data receiving station.

In the ideal case, that is to say when the transmission route characteristics affecting the propagation time of the time stamps are constant over time, there is a linear relationship between the respective time stamp times of transmission and the associated times of reception. The ideal case is illustrated in FIG. 7 by a straight line marked I.

However, since the relationships are not ideal, discrepancies occur from the linear relationship represented by the straight line I. In other words, the respective time stamps represented by dots in FIG. 7 are received by the data receiving device at times which differ from the expected (defined by the straight line I in FIG. 7) times of reception or nominal times of reception. The actual times of reception are, in most cases, before or after the respective nominal times of reception, in which case the respective intervals between the actual times of reception and the nominal times of reception may vary randomly in terms of mathematical sign and magnitude.

These jitter phenomena influence the desired synchronization, to be precise owing to the change this causes in the choice of the count values to be compared with one another.

Specifically, the count which is to be compared with the count represented by the received time stamp is actually that counter count of the data receiving station which the counter is at, at the time when the time stamp is received. Thus, not only the time of reception of the respective time stamps, but also the count to be compared with this, fluctuates with the fluctuation in the transmission time of the time stamps from the data transmitting station to the data receiving station.

Overall, this may lead to the jitter phenomena causing the clock signal generator that generates the clock signal to be synchronized to be readjusted, resulting in incorrect synchronization, or at least having an influence on the readjustment, preventing exact synchronization. This, together with the fact that sudden changes resulting from this may result in the frequency of the clock signal generated in the receiving station are, of course, a problem which must be overcome.

This can be accomplished, for example, by providing a low-path filter which subjects those control signals which are intended for triggering of the clock signal generator in the data receiving station to low-pass filtering before they are applied to the clock signal generator.

The clock signal generator in this case is assumed to be a voltage-controlled crystal oscillator (VCXO), whose output signal is of a frequency which depends on a control voltage CV which is input.

The voltage-controlled crystal oscillator furthermore includes a counter CNT which counts as a function of the clock signal generated by the crystal oscillator VCXO. The count of the counter CNT is in this case incremented by 1 per clock cycle of the generated clock signal.

The count of the counter CNT is fed to a subtraction element, to which the counts which are represented by the respective time stamps are also fed. In the subtraction element, the difference between those counts that are associated with one another by definition is formed in each case after a time stamp has been received.

The output signal from the subtraction element is subjected to low-pass filtering in a low-pass filter, and is passed from there, as the control voltage CV, to the clock signal generator. The low-pass filtering is used to prevent suddenly changing triggering of the crystal oscillator VCXO, which is possible particularly when jitter phenomena occur. The low-pass filter smoothes the difference signal obtained from the differentiation unit, in other words its time waveform, and in this way ensures that the interfering influence of the jitter phenomena is kept within limits.

However, on the other hand, the provision of the low-pass filter has the disadvantage that changes in the frequency of the clock signal of the data transmitting station will, under some circumstances, have only a gradual effect, or no effect whatsoever, on the frequency of the clock signal to be synchronized of the data receiving station. Furthermore, a relatively long time passes after the data receiving station has been switched on or reset before it is running in synchronism with the data transmitting station.

SUMMARY OF THE INVENTION

It is accordingly an object of the invention to provide a method for synchronization of a clock signal, which can be generated in a data receiving station, with a clock signal which is used in a data transmission station which overcomes the above-mentioned disadvantages of the prior art methods devices of this general type, in which synchronization interference caused by the occurrence of jitter phenomena is reduced and exact and fast synchronization of the clock signal of the data receiving station to the clock signal of the data transmitting station is made possible at the same time.

With the foregoing and other objects in view there is provided, in accordance with the invention, an improved method for synchronization of a first clock signal generated in a data receiving station with a second clock signal used in a data transmitting station, the improvement which includes: transmitting timemark data representing a count dependent on a frequency of the second clock signal from the data transmitting station to the data receiving station; evaluating a value and a time of reception of the timemark data in the data receiving station; forming in the data receiving station estimated values based on both current timemark data and previously received timemark data and the estimated values representing a parameter characterizing the frequency of the second clock signal of the data transmitting station; and triggering a clock signal generator to produce the first clock signal to be synchronized to the second clock signal on a basis of the estimated values.

The invention provides for a parameter which characterizes the frequency of the clock signal of the data transmitting station to be estimated in the data receiving station, at least partially taking into account the respective current timemark data and the previously received timemark data, and for a clock signal generator, which produces the clock signal to be synchronized, to be triggered on the basis of the estimated value obtained in this way.

In contrast to conventional synchronization methods, the method according to the invention does not trigger the clock signal generator, which produces the clock signal to be synchronized, directly using the (possibly smoothed) profile of the difference between the respective current counts of the counters provided in the data transmitting station and in the data receiving station, but instead uses an estimated value which characterizes the frequency.

Since the estimation takes account not only of the respective current timemark data but also of the previously received timemark data or time stamps, abrupt changes in the triggering of the clock signal generator can easily be prevented, when required. The influence of the occurrence of jitter phenomena on the synchronization can thus be reduced considerably, to be precise without any losses in the capability for the signal synchronization to be adapted in response to changes in the clock signal which must be synchronized to. The clock signal which must be synchronized to, that is to say, specifically, the clock signal of the data transmitting station normally varies only gradually during normal operation, so that the clock signal to be synchronized must not change suddenly if synchronization is to be maintained.

On the other hand, however, and in contrast to the rest of its behavior, the system under consideration can reach a synchronized state very quickly (suddenly) after being switched on or after being reset. Initially, that is to say immediately after the system has been switched on or reset, there are, specifically, no timemark data available at all for estimating the value determinations, followed by only a small amount of previously obtained timemark data, so that the sluggish reaction of the system, which is desirable in "normal" operation and is based in particular on taking account of the previous relationships, does not yet exist, or exists only to a limited extent.

A method has therefore been found which makes it possible, on the one hand, to achieve a reduction in synchronization interference caused by the occurrence of jitter phenomena while, on the other hand, exact and fast synchronization of the clock signal of the data receiving station to the clock signal of the data transmitting station can be achieved at the same time.

Furthermore, the reaction time of the system to changes in the clock signal to which synchronization is intended can be adjusted or changed in an extremely simple manner by taking account of relatively new and relatively old timemark data to different extents. If, for example, a greater weighting is given to relatively new timemark data than to relatively old timemark data, then the system reacts faster (less sluggishly) than if all the timemark data were, for example, given the same weighting.

Other features which are considered as characteristic for the invention are set forth in the appended claims.

Although the invention is illustrated and described herein as embodied in a method for synchronization of a clock signal, which can be generated in a data receiving station, with a clock signal which is used in a data transmission station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1A:
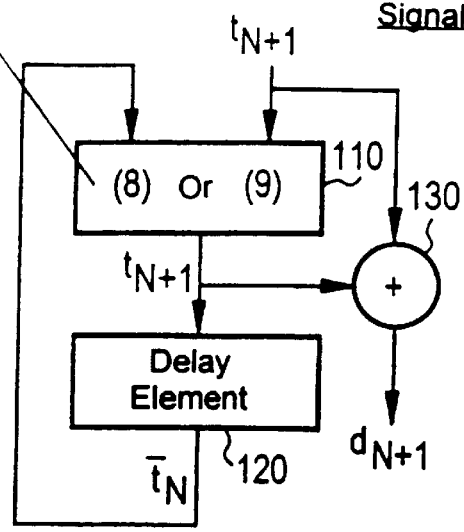
FIGS. 1a–1c are diagrammatic block diagrams of circuits for calculating auxiliary variables which are input to a circuit shown in FIG. 3 according to the invention.

The invention is described in the following text on the basis of a system operating in accordance with the MPEG-2 Standard. However, this should not be regarded as any limitation of the use of the invention to systems operating in accordance with this Standard. In fact, the invention can be used quite generally wherever a clock signal has to be synchronized with another clock signal.

The clock signal that is intended to be used for synchronization is itself assumed to be the clock signal used by a data transmitting station. The clock signal to be synchronized to this clock signal is assumed to be the clock signal generated in a data receiving station.

The clock signal to be synchronized is synchronized using timemark data or time stamps which, as before, are transmitted from the data transmitting station to the data receiving station scattered between the useful data to be transmitted, and at specific time intervals which may be constant or may vary in duration. To this extent, there is no difference between the known synchronization methods and the synchronization method according to the invention described above. With regard to further details, in particular details relating to time stamp generation and to time stamp transmission, reference can thus be made to the statements made in the introduction and to the definition of the MPEG-2 Standard (for example in the ISO/IEC Standards).

In all the figures of the drawing, sub-features and integral parts that correspond to one another bear the same reference symbol in each case. Referring now to the figures of the drawing in detail and first, particularly, to FIG. 8 thereof, there is shown a prior art clock signal generator triggering system.

The clock signal generator to be controlled, that is to say the clock signal generator which is accommodated in a data receiving station and produces a clock signal to be synchronized, is accommodated in a block marked by the reference symbol 30. The clock signal generator in this case is assumed to be a voltage-controlled crystal oscillator (VCXO), whose output signal A is of a frequency that depends on a control voltage CV which is input.

The block 30 furthermore includes a counter CNT that counts as a function of the clock signal generated by the crystal oscillator VCXO. The count of the counter CNT is in this case incremented by 1 per clock cycle of the generated clock signal.

The count of the counter CNT is fed to a subtraction element 10, to which the counts (input signal E) which are represented by the respective time stamps are also fed. In the subtraction element 10, the difference between those counts that are associated with one another by definition is formed in each case after a time stamp has been received.

The output signal from the subtraction element 10 is subjected to low-pass filtering in the low-pass filter 20, and is passed from there, as the control voltage CV, to the clock signal generator. The low-pass filtering is used to prevent suddenly changing triggering of the crystal oscillator VCXO, which is possible particularly when jitter phenomena occur. The low-pass filter 20 smoothes the difference signal obtained from the differentiation unit 10, in other words its time waveform, and in this way ensures that the interfering influence of the jitter phenomena is kept within limits.

However, the provision of the low-pass filter 20 has the disadvantage that changes in the frequency of the clock signal of the data transmitting station will, under some circumstances, have only a gradual effect, or no effect whatsoever, on the frequency of the clock signal to be synchronized of the data receiving station. Furthermore, a relatively long time passes after the data receiving station has been switched on or reset before it is running in synchronism with the data transmitting station.

Figure 8:
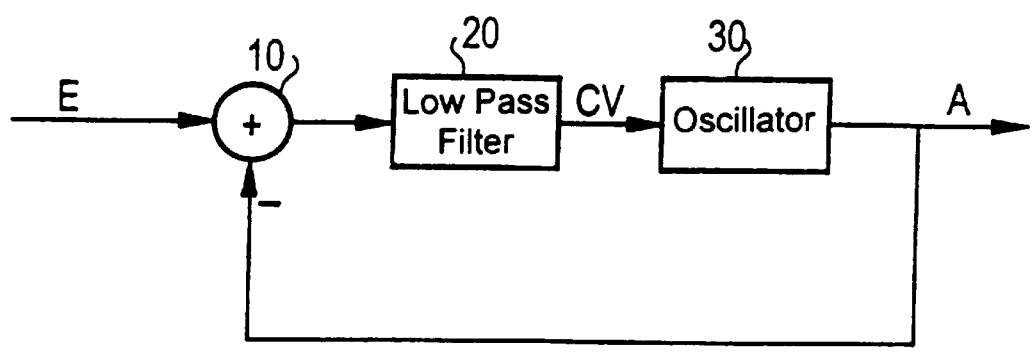
FIG. 8 is a block diagram explaining a known, prior art time stamp processing method in the data receiving station.

In contrast to the known clock signal generator triggering system shown in FIG. 8, the clock signal generator that generates the clock signal to be synchronized is, however, triggered using an estimated value that characterizes a frequency.

One suitable estimated value in this case is an estimated value that characterizes the frequency of the clock signal of the data transmitting station.

In the exemplary embodiments described, this estimated value represents the (estimated) frequency of the clock signal of the data transmitting station itself or, particularly if the nominal frequency of this clock signal is known, the (estimated) error between the frequency of the clock signal of the data transmitting station and its known nominal frequency.

The estimated value can, possibly after it has been converted into a suitable control signal (control voltage, control current etc.), be used indirectly or directly for triggering the clock signal generator which generates the clock signal to be synchronized. Whether and to what extent any further processing of the estimated value is required in this case depends primarily on the control signal expected from the clock signal generator. Irrespective of this, the estimated value may, however, of course be subjected to any desired modifications and/or further processing operations before it is used for clock signal generator triggering.

The estimated value is formed in the data receiving station at least partially taking into account the respective current timemark data or time stamps and the previously received timemark data or time stamps. The way in which this can be done, and the detailed considerations to which it is subject, will be described in detail in the following text with reference to two exemplary embodiments.

First of all, a first exemplary embodiment of the method according to the invention will now be described with reference to FIGS. 1 to 3.

The following statements are based on a time $t'_0 = 0$, in which the counter in the data transmitting station may be at an initial count $c_0$, and from which time the already mentioned time stamps are output continually by the data transmitting station at regular or varying time intervals, in which the count $c_n$, which is represented by an n-th time stamp, can be expressed as $$c_n = c_0 + (f_c + \Delta f) \cdot t'_n, \quad n \geq 1 \qquad (1a)$$

where:
$c_0$ is the already mentioned initial count,
$f_c$ is the nominal frequency (27 MHz in the exemplary embodiment under consideration) of the clock signal of the data transmitting station,
$\Delta f$ is an error between the frequency of the clock signal of the data transmitting station and its nominal frequency, and
$t'_n$ is the time, which is related to $t'_0$, at which the counter in the data transmitting station is at the count $c_n$ which is sent as the time stamp.

The time stamps that are output by the data transmitting station at the times $t'_n$, to be precise the respective last bit of these time stamps, are received in the data receiving station at times $t_n$ which are related to a time $t_0$ which corresponds to the time $t'_0$.

The times $t_n$ which are related to to correspond in the ideal situation to the times $t'_n$ which are related to $t'_0$. However, as has already been mentioned in the introduction, the ideal situation (generally) does not happen often, owing to the occurrence of jitter phenomena. In practice, there is therefore a relationship $$t_n t'_n + t_{jitter,n} \qquad (1b)$$

where $t_{jitter,n}$ represents the extent of propagation time fluctuation, caused by the jitter phenomenon, of the respective n-th time stamp on its route from the data transmitting station to the data receiving station.

Equation (1a) can thus, accordingly, also be written as follows:

$$c_n = c_0 + (f_c + \Delta f) \cdot (t_n - t_{jitter,n}), \quad n \geq 1 \qquad (1c)$$

For large values of n, the value for $t_n$, which increases as the values of n increase, is very much larger than the value of $t_{jitter,n}$, which admittedly is also dependent on n, but does not increase with n. Thus $t_{jitter,n}$ may be ignored when n is very large, so that Equation (1c) can be written, with adequate accuracy, as $$c_n = c_0 + (f_n + \Delta f) \cdot t_n, \quad n >> 1 \qquad (1d)$$

Despite all this, the omission of $t_{jitter}$ in Equation (1d) results in a difference between the counts $c_n$, which are represented by the respective time stamps, and the counts which are calculated in accordance with Equation (1d). However, like $t_{jitter}$ itself, the mathematical sign and magnitude of the differences fluctuate, so that the sum of the respective differences formed over a lengthy time period tends to 0; this effect is utilized in particular in Equation (2), which will be explained later.

Of the parameters used in Equation (1d), $c_n$ and $t_n$ are known in the data receiving station, since they correspond to the respective content and the respective time of reception of the n-th time stamp. The nominal frequency $f_c$ is likewise known in the data receiving station (for example on the basis of an appropriate preset) in the present exemplary embodiment. The values for $c_0$ and $\Delta f$ are unknown in the data receiving station and are thus determined by an estimation process in the data receiving station, as will be described in detail later.

The estimated value for $\Delta f$ at the known nominal frequency $f_c$ of the clock signal which is to be used for synchronization is a parameter which characterizes the frequency of this clock signal and, as has already been indicated above, can for this reason be used indirectly or directly for triggering the clock signal generator in the data receiving station (in order to control the frequency of the clock signal to be synchronized). However, alternatively, the sum of the known frequency $f_c$ and of the estimated frequency $\Delta f$ can also in this case be used to trigger the clock signal generator.

The estimated value for $c_0$ is required on the one hand to make it possible to determine whether and, if appropriate, to what extent there is a difference between the counts $c_n$ which are represented by the time stamps and the counts which can be calculated using the estimated values for $c_0$ and $\Delta f$ in accordance with Equation (1d). This will be explained in more detail later.

The estimated values for $c_0$, however, on the other hand also allow the reference times (which have already been mentioned above) in the data receiving station to be defined (corrected) exactly and/or, the time which has passed since a reference time to be determined exactly, either directly or indirectly (by virtue of the resulting capacity to calculate corrected counts $c_n$, that is to say counts which are free of the influence of jitter phenomena). This is of major interest since it is possible for the data transmitting station to determine that specific data must be output or further processed by the data receiving station exactly at a predetermined time after the said reference time.

The unknown values for $c_0$ and $\Delta f$ in the present exemplary embodiment are, talking in general terms, estimated to minimize a sum of the squares of the values (errors) which, in the data transmitting station, characterize the differences between the relationships represented by timemark data, and the relationships calculated using the estimated values.

The values which characterize the differences are in this case count differences which result from comparison of the counts which are represented by the timemark data with the counts which are calculated in accordance with Equation (1d) using the estimated values.

However, it should be mentioned at this point that this is not the only way to produce the estimated values.

The use of $$\sum_{n=1}^{N} \gamma^{N-n} \cdot (c_n - (f_c + \Delta_{\hat{f}_N}) \cdot t_n - \hat{c}_{0,N})^2 \quad (2)$$

has been found to be particularly advantageous as the sum to be minimized, where $c_n$ is the count which is represented by the Nth timestamp, $\Delta_{\hat{f}_N}$ is the value of $\Delta f$ estimated at the time of the N-th time stamp, $\hat{c}_{0,N}$ is the value for $c_0$ estimated at the time of the N-th time stamp, and $\gamma$ is a weighting value for individual weighting of the individual sum elements.

The estimated values $\Delta_{\hat{f}_N}$ and $\hat{c}_{0,N}$ depend on N, that is to say the number of time stamps to be considered or which can be considered in the estimation. The larger the value of N, the more accurate is the match between the estimated values and the actual values, as a rule.

The introduction of the exponential weighting factor $\gamma$ in Equation (2) deserves particular attention. The weighting factor $\gamma$ determines the weighting with which the respective square of the error is included in the sum of the squares of the errors to be minimized.

The smaller the value of $\gamma$ is chosen to be, the (relatively) weaker is the attention paid to (older) relationships which are further back in comparison with more recent (younger and up-to-date) relationships. The value of $\gamma$ thus indirectly determines how quickly the system reacts to current (actual or apparent) changes in the relationships. If one wishes to preclude the influence of the jitter phenomenon on the synchronization, the system is preferably given a sluggish reaction to current changes in the relationships. Such a sluggish reaction, which can be achieved by setting $\gamma$ to 1 or somewhat less than 1, eliminates the influence of jitter phenomena which simulate sudden changes in the clock signal which is intended to be used for synchronization. On the other hand, however, this has no adverse affect on the quality of the synchronization since the clock signal which is intended to be used for synchronization (to be more precise the frequency of it, which is primarily of interest) either does not change at all during "normal" operation or else changes extremely slowly (at a maximum of 0.075 Hz/s according to the MPEG-2 Standard), so that there is no need to make any sudden adaptations in the synchronization. However, the sluggishness produced by $\gamma$ has no effect or, in any case, has only a very minor effect, on the synchronization after the system has been switched on or reset, since, of course, no older relationships are available at these times, so that the synchronization is initially carried out exclusively taking account of current and only a few recent relationships which, at least initially, allows sudden and thus very fast synchronization. Deliberate resetting of the system during "normal" operation or other measures which may be compared and whose effect is comparable make it possible for the sudden adaptations to be carried out, if required, even during "normal" operation.

If one chooses $\gamma$ to be less than 1, then, in some circumstances, this can achieve a positive effect in that the current and more recent relationships are given stronger weighting than the relatively old (older) relationships. In this case, it may also possibly be found to be advantageous if $\gamma^{N-n}$ is additionally defined such that a lower limit is not undershot.

Definition of $\gamma$ to have values less than 1 is also advantageous since, in particular, the result of the sum formed from Equation (2) remains at a comparatively low value which, as can be seen, requires relatively little effort for its storage and handling.

The utilization of the estimated values determined as the point of origin, using Equation (2), for the synchronization is thus ideally suitable for achieving fast and exact synchronization, while eliminating influences caused by jitter phenomena.

It is helpful to introduce a number of auxiliary variables in order to minimize the sum of the weighted error squares represented by Equation (2).

First of all, a (weighted) average count $\bar{c}_N$, based on a sum of exponentially weighted counts (time stamp contents) and a (weighted) average time stamp time of reception $\bar{t}_N$, based on a sum of exponentially weighted time stamp times of reception, are introduced and are defined, respectively, as $$\bar{c}_N = \frac{1-\gamma}{1-\gamma^N} \cdot \sum_{n=1}^{N} \gamma^{N-n} \cdot c_n \text{ or} \quad (3)$$

$$\bar{t}_N = \frac{1-\gamma}{1-\gamma^N} \cdot \sum_{n=1}^{N} \gamma^{N-n} \cdot t_n$$

If the weighting factor $\gamma$ in Equation (3) is set to 1, then this gives, respectively:

$$\overline{c}_N = \frac{1}{N} \cdot \sum_{n=1}^{N} c_n \text{ or } \overline{t}_N = \frac{1}{N} \cdot \sum_{n=1}^{N} t_n \qquad (4)$$

The difference $$d_n = t_n - \overline{t}_n \qquad (5)$$

and the continuous square time term $$T_N = \sum_{n=1}^{N} \gamma^{N-n} \cdot (t_n - \overline{t}_n)^2 \qquad (6)$$

are introduced as further auxiliary variables, in which case the latter, simplified for $\gamma=1$, can be written as:

$$T_N = \sum_{n=1}^{N} (t_n - \overline{t}_n)^2 \qquad (7)$$

The calculation of the auxiliary variables defined in Equations (3) to (7) is relatively complex in some circumstances since, for each of the N time stamps to be considered, it must be possible to call up their respective contents $c_n$ and their times of reception $t_n$ for this purpose. Particularly if N is chosen to be very large, this may necessitate relatively complex hardware owing to the correspondingly large memory requirement, for which reason, in certain cases, it may be preferable to define the auxiliary variables in accordance with Equations (3) to (7) such that the values for the time N+1 are based just on the corresponding values at the times N and N+1, that is to say can be calculated recursively. The size of the memory area to be provided thus becomes independent of N, and can be reduced to a minimum. Furthermore, the auxiliary variables can be calculated considerably more quickly, owing to the considerable reduction in the respective amount of data to be calculated.

The reformulation which has been found of the auxiliary variables defined in Equations (3) to (7) into auxiliary variables which can be determined by recursive calculation leads to the result that the weighted average time stamp times of reception and average time stamp contents defined in Equations (3) and (4) can also be written as $$\overline{t}_{N+1} = \frac{1-\gamma}{1-\gamma^{N+1}} \cdot t_{N+1} + \gamma \cdot \frac{1-\gamma^N}{1-\gamma^{N+1}} \cdot \overline{t}_N \qquad (8)$$

or (for $\gamma=1$)

$$\overline{t}_{N+1} = \frac{1}{N+1} \cdot t_{N+1} + \frac{N}{N+1} \cdot \overline{t}_N \qquad (9)$$

and $$\overline{c}_{N+1} = \frac{1-\gamma}{1-\gamma^{N+1}} \cdot c_{N+1} + \gamma \cdot \frac{1-\gamma^N}{1-\gamma^{N+1}} \cdot \overline{c}_N \qquad (10)$$

or (for $\gamma=1$)

$$\overline{c}_{N+1} = \frac{1}{N+1} \cdot c_{N+1} + \frac{N}{N+1} \cdot \overline{c}_N \qquad (11)$$

respectively, and that the square time terms defined in Equations (6) and (7) can also be written as $$T_{N+1} = \gamma \cdot T_N + \gamma \cdot \frac{1-\gamma^{N+1}}{\gamma \cdot (1-\gamma^N)} \cdot d_{N+1}^2 \qquad (12)$$

or (for $\gamma=1$)

$$T_{N+1} = T_N + \frac{N+1}{N} \cdot d_{N+1}^2 \qquad (13)$$

If one uses the previously defined auxiliary variables, then $\Delta \hat{f}_N$ and $\hat{c}_{0,N}$ can be calculated or estimated, minimizing (zeroing) the sum in Equation (2), approximately as $$\Delta \hat{f}_N = \frac{1}{T_N} \cdot \sum_{n=1}^{N} \gamma^{N-n} \cdot (t_n - \overline{t}_n) \cdot (c_n - f_c \cdot t_n) \qquad (14)$$

or—using the recursive method—as $$\Delta_{\hat{f}_{N+1}} = \frac{\gamma T_N}{T_{N+1}} \cdot \Delta_{\hat{f}_N} + \frac{d_{N+1}}{T_{N+1}} \cdot \qquad (15)$$
$$((c_{N+1} - f_c \cdot t_{N+1}) - (\overline{c}_N - f_c \cdot \overline{t}_N))$$

and $$\hat{c}_{0,N} = \overline{c}_N - (f_c + \Delta_{\hat{f}_N}) \cdot \overline{t}_N \qquad (16)$$

Figure 1B:
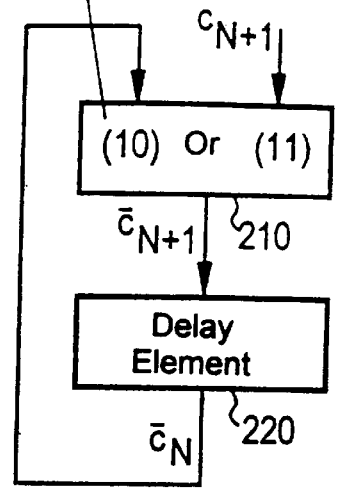
Figure 1C:
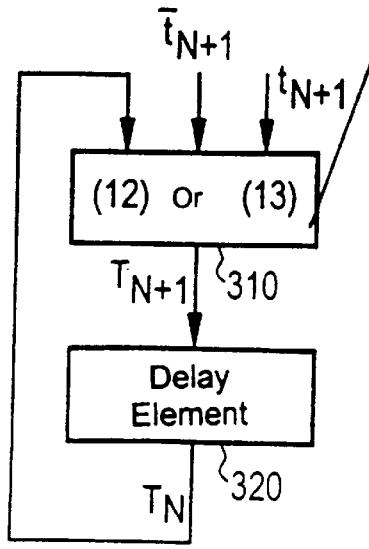
Figure 2:
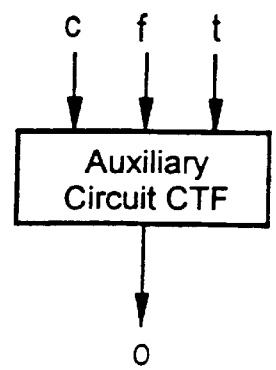
FIG. 2 is a block diagram of an auxiliary circuit that is used a number of times in the circuit shown in FIG. 3.
Figure 3:
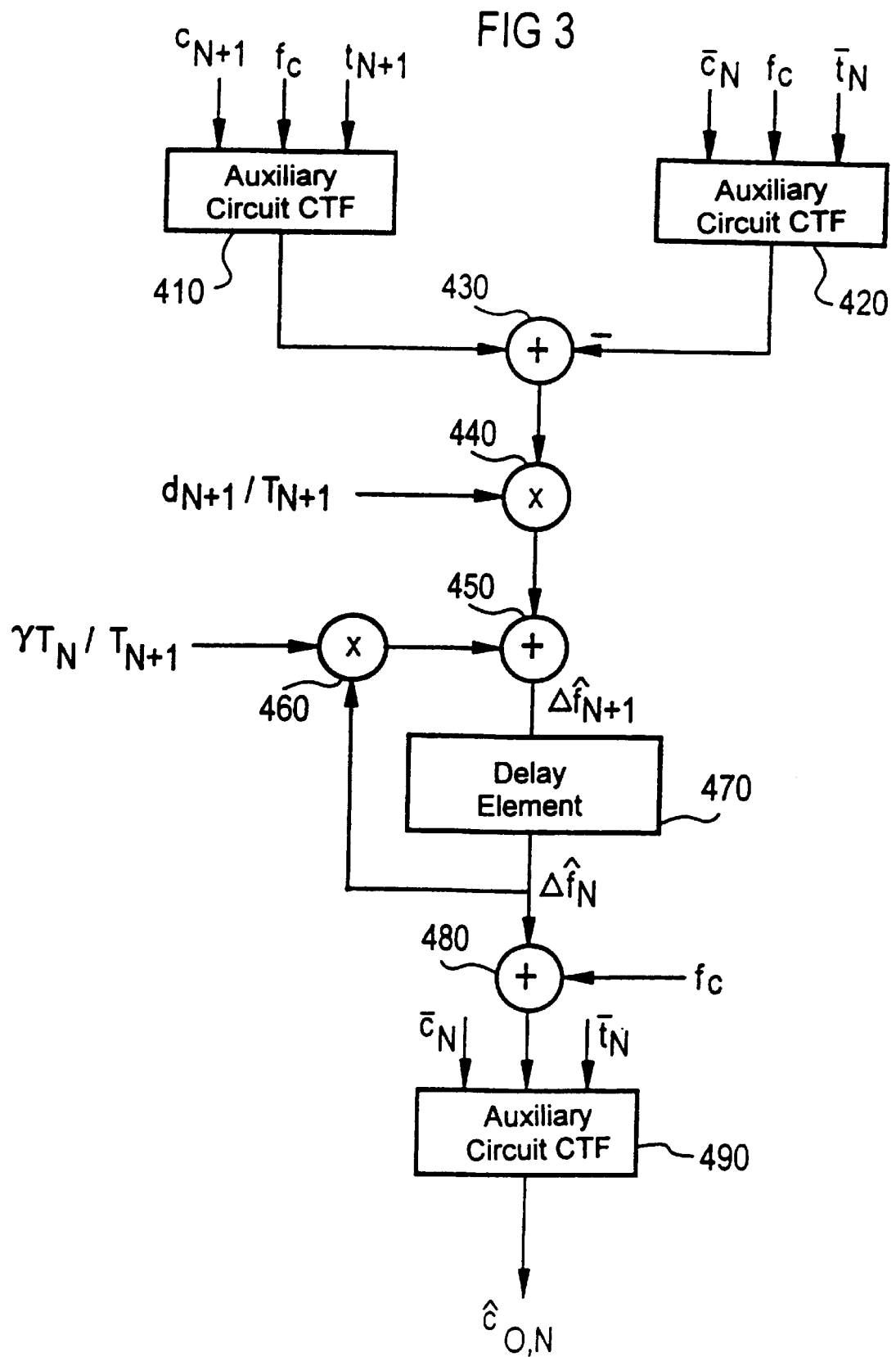
FIG. 3 is a block diagram of a circuit for estimating a parameter which characterizes a frequency of a clock signal of a data transmitting station, according to a first exemplary embodiment.

One option for the circuitry implementation to calculate the estimated values in accordance with Equations (15) and (16) is shown in FIGS. 1 to 3.

FIG. 1 relates to the calculation of the auxiliary variables in accordance with Equations (5), (8) and (9), (10) and (11), as well as (12) and (13).

The calculation of the auxiliary variables in accordance with Equations (5) and (8) and/or (9) can be carried out by a circuit whose block diagram is shown in FIG. 1A.

According to the illustration in FIG. 1A, a signal processing circuit 110 (which works out the Equation (8) or (9) depending on the value chosen for $\gamma$), a delay element 120 and an adder 130 are required for this purpose, which are wired up and have signals applied to them as shown.

The calculation of the auxiliary variables in accordance with Equations (10) and (11) can be carried out by a circuit whose block diagram is shown in FIG. 1B.

According to the illustration in FIG. 1B, a signal processing circuit 210 (which works out the Equation (10) or (11) depending on the value chosen for $\gamma$, and delay element 220 are required for this purpose, which are wired up and have signals applied to them as shown.

The calculation of the auxiliary variables in accordance with Equations (12) and (13) can be carried out by a circuit whose block diagram is shown in FIG. 1C.

According to the illustration in FIG. 1C, a signal processing circuit 310 (which works out the Equation (12) or (13) depending on the value chosen for $\gamma$, and delay element 320 are required for this purpose, which are wired up and have signals applied to them as shown.

FIG. 2 shows an auxiliary circuit which is designated CFT there and in FIG. 3 and calculates the output signal o=c-ft from three input signals c, f and t.

The auxiliary variables calculated by way of example according to FIG. 1, and other input parameters, can be interrelated to one another using the auxiliary circuit shown in FIG. 2 and additional standard circuits, in such a manner that they result in the estimated values $\Delta \hat{f}_N$ and $\hat{c}_{0,N}$, calculated in accordance with Equations (15) and (16), being obtained.

This is shown in FIG. 3. According to the illustration in FIG. 3, the estimated value is calculated using auxiliary circuits 410, 420 and 490 which are shown in FIG. 2, a subtractor 430, adders 450 and 480, multipliers 440 and 460 and a delay element 470, which are wired up and have signals applied to them as shown in the FIG. 3.

The estimated values obtained in this way are highly suitable, as has already been explained above, for qualitatively extremely high-quality synchronization (if necessary, particularly quickly and otherwise very accurately and without being susceptible to interference) of a clock signal to another clock signal and, in consequence, allow the disadvantages associated with the known synchronization methods to be overcome relatively easily.

A second exemplary embodiment of the method according to the invention will now be described with reference to FIGS. 4 to 6.

The estimated value which characterizes the frequency of the clock signal of the data transmitting station is determined, in the second exemplary embodiment, in two steps, namely a calculation step followed by a filter step.

In the calculation step, the (apparent) frequency ($f_{raw}$) of the clock signal of the data transmitting station is calculated using the difference ($\Delta ets$) between counts which are represented by two time stamps and the time ($\Delta t$) which has passed between reception of one time stamp and reception of the other time stamp. If one considers that the time $\Delta t$ can be expressed in terms of the difference ($\Delta dts$) between the counts of the data receiving station counter which will pertain there on reception of the time stamps used to determine $\Delta ets$, and using the frequency ($f_{VCXO}$) of the clock signal which is produced in the data receiving station and is to be synchronized ($\Delta t = \Delta dts / f_{VCXO}$), then the calculation (carried out in the calculation step) of the apparent frequency $f_{raw}$ of the clock signal with which synchronization is intended can be expressed by $$f_{raw} = \frac{\Delta ets}{\Delta t} = \frac{\Delta ets}{\Delta dts} \cdot f_{VCXO} \quad (101)$$

in which case $f_{raw}$ is the apparent frequency of the clock signal of the data transmitting station, $\Delta ets$ is the difference between counts which are represented by two time stamps, $\Delta t$ is the time which passes between the times of reception of the time stamps used to calculate Dets, $\Delta dts$ is the difference between the counts of the counter in the data receiving station which are reached at the said times of reception of the said time stamps, and $f_{VCXO}$ is the frequency of the clock signal which is generated in the data receiving station and is to be synchronized (and is preferably also the value by which the clock signal generator which generates the clock signal is triggered).

For example, for reasons of accuracy, it may (as was also the case with the first exemplary embodiment) be found to be advantageous, rather than working with the frequencies $f_{raw}$ and $f_{VCXO}$ of the clock signals of the data transmitting station and of the data receiving station themselves, to work with the errors $\Delta f_{raw}$ and $\Delta f_{VCXO}$ between these frequencies and their known nominal frequency which, in the present exemplary embodiment, may once again be 27 MHz. The relationship between the frequencies $f_{raw}$ and $f_{VCXO}$ of the clock signals themselves and the errors $\Delta f_{raw}$ and $\Delta f_{VCXO}$ between these frequencies and their known nominal frequency can be expressed by:

$$f_{raw} = 27\ \text{MHz} + \Delta f_{raw}, f_{VCXO} 27\ \text{MHz} + \Delta f_{VCXO} \quad (102)$$

If Equation (102) is substituted in Equation (101), then this gives:

$$\Delta f_{raw} = \frac{\Delta ets}{\Delta dts} \cdot \Delta f_{VCXO} + \frac{\Delta ets + \Delta dts}{\Delta dts} \cdot 27\ \text{MHz} \quad (103)$$

Both $f_{raw}$ according to Equation (101) and $\Delta f_{raw}$ according to Equation (103) are in principle suitable to be used as a basis for triggering a clock signal generator which produces the clock signal to be synchronized. However, these parameters are still influenced by the jitter phenomenon, which is overcome by the filter step that follows the calculation step.

The filtering, carried out in the filter step, of the signals $f_{raw}$ and $\Delta f_{raw}$ calculated in the calculation step has the purpose of retrospectively correcting these signals. To be more precise, the filter step is intended to correct (incorrect) calculations that are caused, in particular, by the received time stamps being subject to the influence of jitter phenomena.

In the rest of the explanation, it is now assumed that the errors from the known nominal frequencies are used, that is to say that $\Delta f_{raw}$ is the value which is to be subjected to filtering. However, it should be mentioned once again that the calculation and further processing of the clock signal frequency $f_{raw}$ is also possible.

A parameter $\Delta f_{filter}$ from which interference influences have been removed is produced from $\Delta f_{raw}$ in the filter step. If the time stamps have not been subjected to any interference from jitter phenomena etc. during their transmission from the data transmitting station to the data receiving station, then, in any case in the steady state, $\Delta f_{raw} = \Delta f_{filter}$; otherwise, the parameters differ.

This can be achieved (and this is one of the major special features of the described estimated value determination method) by using an adaptive filter whose output signal $\Delta f_{filter}$ for the nth time stamp can be calculated using the formula:

$$\Delta f_{filter,n} = \Delta f_{filter,n-1} + \alpha_n (\Delta f_{raw,n} - \Delta f_{filter,n-1}) \quad (104)$$

where $\Delta f_{filter,n}$ is the adaptive filter output signal $\Delta f_{filter}$ relating to the n-th time stamp, $\Delta f_{filter,n-1}$ is the adaptive filter output signal $\Delta f_{filter}$ relating to the (n-1)-th time stamp, $\Delta f_{raw,n}$ is the input signal $\Delta f_{raw}$ relating to the n-th time stamp, into the adaptive filter, and $\alpha$ is a filter coefficient or weighting factor, relating to the n-th time stamp, of the adaptive filter.

The adaptive filter is initialized for n=0 with the value $\Delta f_{filter,n} = 0$.

If the filter coefficient $\alpha$ is equal to 1, then the input signal and the output signal are identical, and there is thus no filtering. If the filter coefficient $\alpha$ is equal to 0, the output signal is a constant ($\Delta f_{filter,n-1}$) irrespective of the input signal. The filter coefficient used in the following exemplary embodiment is defined to be variable with time (continuously reducing). A good choice for the filter coefficient α is to define it to be:

$$\alpha_{n+1} = \frac{\alpha_n}{\alpha_n + 1}, \alpha_1 = 1 \quad (105)$$

In consequence, continuously reducing filter coefficients $\alpha_1, \alpha_2, \alpha_3$, are obtained of 1, ½, ⅓. . . for the first, second, third . . . time stamps.

As long as n is small, that is to say once the system has been switched on or reset, large filter coefficients are accordingly used, as a result of which the influence on the output signal ($\Delta f_{filter}$) of the signal ($\Delta f_{raw}$) which has been input into the adaptive filter is relatively large, so that the synchronization, at least the initial rough synchronization of the clock signal to be synchronized, can be carried out very quickly. As the values of n increase, that is to say as the system changes over to "normal" operation, the filter coefficients become ever smaller, and the reaction of the system to actually or apparently changed relationships in the data transmitting station becomes ever weaker and more sluggish.

In order to prevent the system from no longer reacting at all to changes (as n becomes very large, α tends to 0), it can be provided for a lower limit to be defined for the filter coefficient α which must not be undershot. The change in the filter coefficient can in this way be limited such that the influence of the parameter ($\Delta f_{raw}$) (calculated in the calculation step) on the output signal ($\Delta f_{filter}$) of the adaptive filter does not fall below a certain minimum level.

The output signal $\Delta f_{filter}$ generated in the filter step is suitable, as has already been mentioned above, for triggering a clock signal generator that produces the clock signal to be synchronized.

Alternatively, as will also be explained in the following text with reference to FIG. 4, further modification or filtering can be carried out before this signal is used as a control signal for controlling the clock signal generator.

Figure 4:
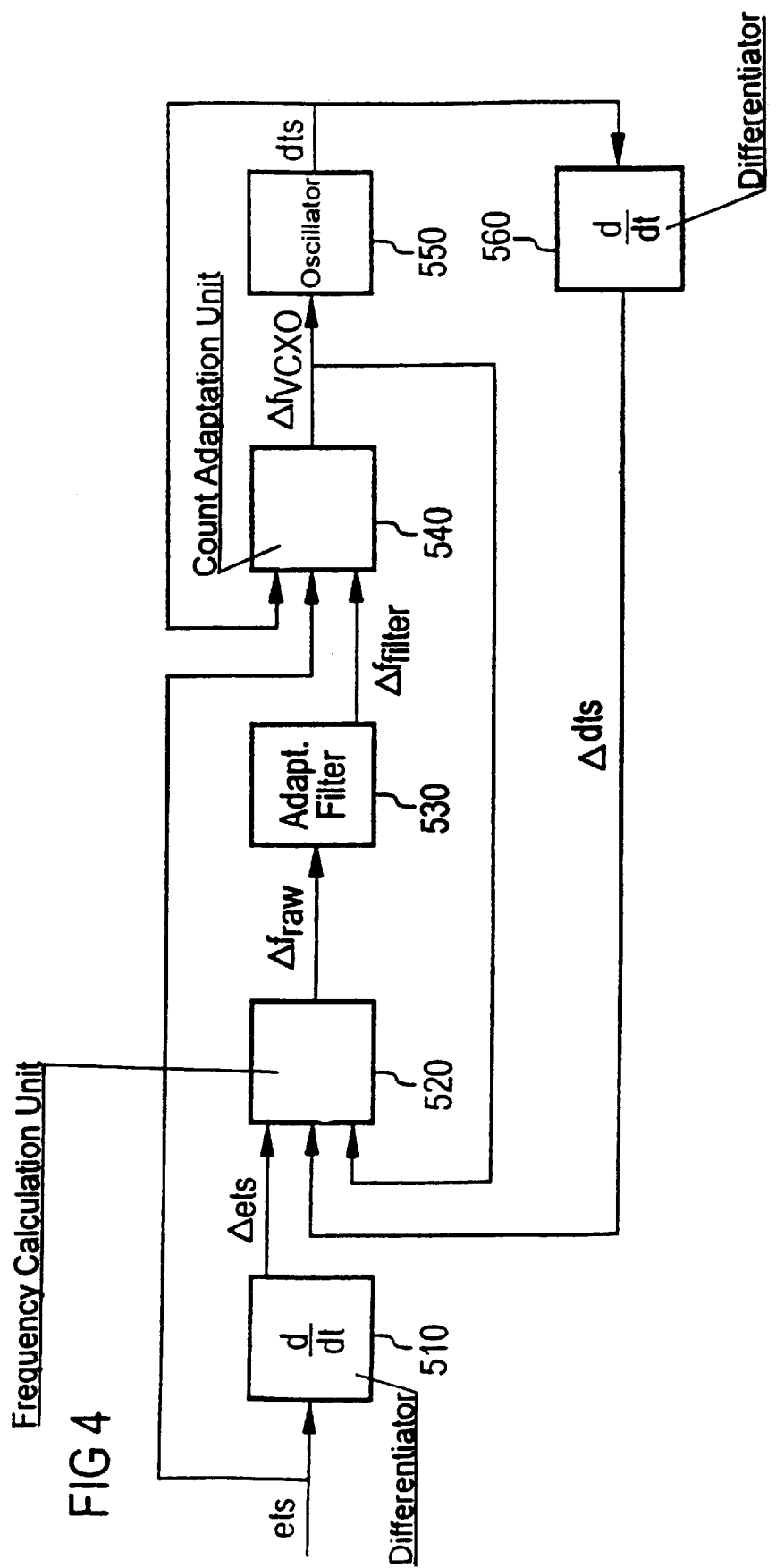
FIG. 4 is a block diagram of a circuit, for synchronization of the clock signal to be synchronized, in the data receiving station, with a parameter which characterizes a frequency of the clock signal of the data transmitting station being estimated, according to a second exemplary embodiment.

FIG. 4 shows one possible practical implementation of the described estimation of the relationships which occur in the data transmitting station and of the synchronization, based on this, of the clock signal to be synchronized.

The clock signal generator, which produces the clock signal to be synchronized, is accommodated in a clock signal generator block that is denoted by the reference symbol 550. The internal configuration of this block is shown in FIG. 5.

Figure 5:
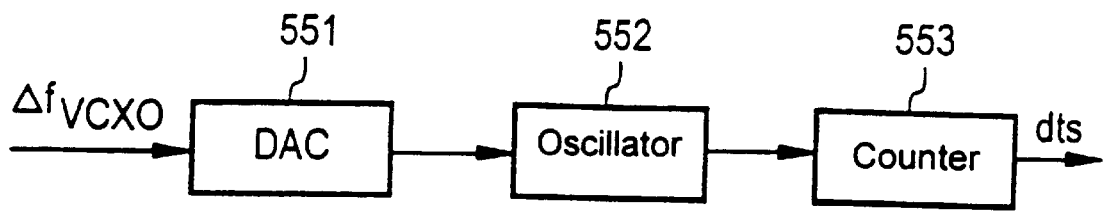
FIG. 5 is a block diagram illustrating an internal configuration of block 550 used in the circuit shown in FIG. 4.
Figure 6:
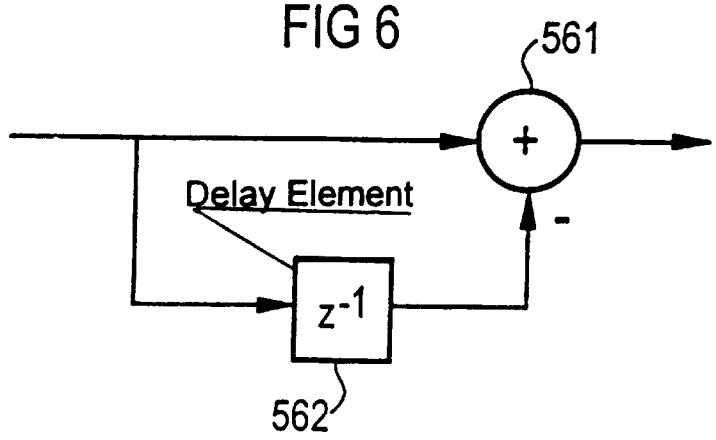
FIG. 6 is a block diagram illustrating an internal configuration of blocks 510 and 560 used in the circuit shown in FIG. 4.
Figure 7:
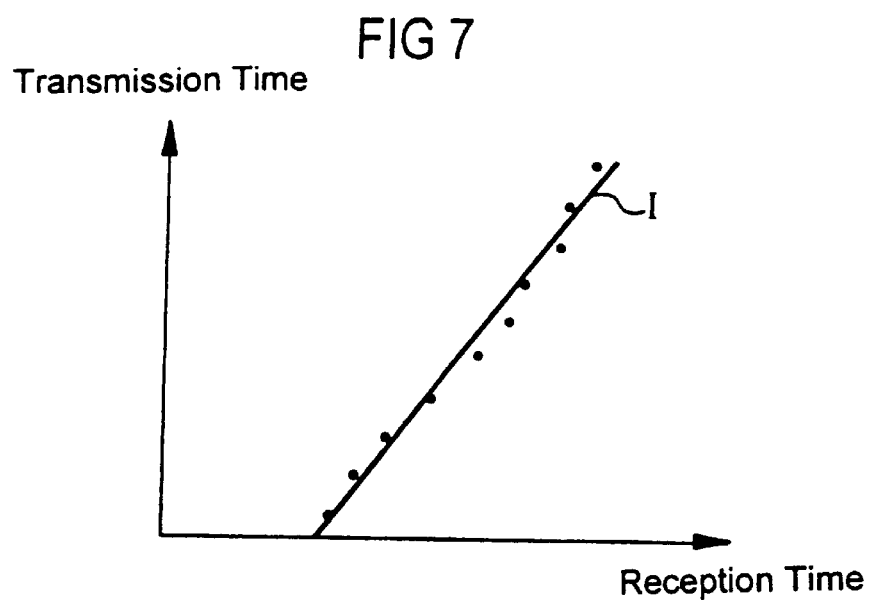
FIG. 7 is a graph illustrating the effect of jitter phenomena on time stamp transmission or transmissions.

According to FIG. 5, the clock signal generator block 550 includes a digital/analog converter 551, the clock signal generator in the form of a voltage-controlled crystal oscillator (VCXO) 552, and a counter 553.

The digital/analog converter 551 uses the digital input signal $\Delta f_{VCXO}$ to produce the analog parameter (voltage, current etc.) required to trigger the crystal oscillator. The digital/analog converter 551 is scaled or can be scaled such that the frequency values (or the errors from a nominal frequency represented in this way) which can be represented by the input signal $\Delta f_{VCXO}$ are converted into those analog parameters which cause the clock signal generator to generate the desired frequency.

The crystal oscillator 552 reacts to the input voltage in such a manner that the frequency of the clock signal generated by this crystal oscillator 552 depends on this input voltage.

The counter 553 is the counter in the data receiving station, which has already been mentioned a number of times. It is triggered by the clock signal that is generated by the crystal oscillator and is to be synchronized, in such a manner that its count is incremented by 1 per clock cycle of the clock signal. The output signal from the counter is the signal dts (decoder time stamp) which represents the respective count of the counter and has already been mentioned a number of times above.

The signal dts is differentiated with respect to time in a differentiation unit 560. FIG. 6 shows one possible internal configuration of the differentiation unit. According to FIG. 6, the differentiation unit 560 consists of a differentiating element 561 and a delay element 562. The output signal from the differentiating element 561, which is also the output signal from the differentiation unit 560, is the difference between the current dts value and a previous dts value (delayed by the delay element 562). To be more precise, this is the signal Δdts that has likewise already been mentioned a number of times above. The duration of the delay time produced by the delay element 562 is variable; it both starts and ends on reception of a data transmitting station time stamp ets (encoder time stamp).

The signal Δdts produced by the differentiation unit 560 is input to a frequency calculation unit 520.

The signal Δets, which is already known from the previous description, is likewise input to the frequency calculation unit 520. The signal Δets is the output signal from a differentiation circuit 510, which is configured as shown in FIG. 6 and in which the difference is formed between those counts of the counter in the data transmitting station which are represented by the current time stamp and the preceding time stamp.

Finally, the control signal $\Delta f_{VCXO}$, which is input to the clock signal generator block 550, is also input to the frequency calculation unit 520. There is a noticeable positive effect here due to the fact that the clock signal generator is triggered via the circuitous route to determine $\Delta f_{VCXO}$. That is to say the error which there is intended to be between the clock signal to be generated and the known nominal frequency of the clock signal in the data transmitting station. Specifically, on the one hand, the value of $\Delta f_{VCXO}$ can be determined and processed further relatively easily in the course of the triggering of the clock signal generator that is to be carried out while, on the other hand, owing to the fact that its contents are highly significant for synchronization, it can be used a number of times, for example in the circuit shown in FIG. 4.

The frequency calculation unit 520 is that unit in which the previously described calculation step is carried out. That is to say, it uses the input signals Δdts, Δets, $\Delta f_{VCXO}$ and the nominal frequency of the clock signal of the data transmitting station (27 MHz), which is known by it or is likewise input to it, to calculate the frequency $\Delta f_{raw}$ in accordance with Equation (103).

The frequency $\Delta f_{raw}$ is input to an adaptive filter 530, which is the adaptive filter, which has already been mentioned a number of times above, for carrying out the filter step.

The signal $\Delta f_{raw}$ that is input to the adaptive filter 530 is further-processed there, using Equations (104) and (105), to form $\Delta f_{filter}$. The signal $\Delta f_{filter}$, which may differ from the signal $\Delta f_{filter}$ which was previously calculated but is subject to interference in some circumstances, is based on what is generally a very good estimate of the relationships prevailing in the data transmitting station. To be more precise, this is a parameter that characterizes the frequency of the clock signal of the data transmitting station and is thus particularly highly suitable to be used as a basis for triggering the clock signal generator. That is to say, $\Delta f_{filter}$ could actually be input instead of $\Delta f_{VCXO}$ to the block 550 that contains the clock signal generator.

However, in the present exemplary embodiment, $\Delta f_{filter}$ is first of all input to a count adaptation unit 540, in which this signal is converted into the signal $\Delta f_{VCXO}$ on which, in the end, the clock signal generator triggering is actually based.

The conversion is intended to result in the counts ets and dts of the counters in the data transmitting station and in the data receiving station being identical, or at least having a constant difference. This may be of not inconsiderable importance, particularly since the count of the counter in the data receiving station may be used in order to fix defined reference times and/or to determine the time that has passed since the reference time.

A constant difference between the counts cannot be reliably achieved just by synchronization of the clock signal in the data receiving station since any synchronization error, even if it is very short, leads to a change in the count difference. In which the count difference can no longer be counteracted by matching the frequency of the clock signal to be synchronized to the frequency of the clock signal in the data transmitting station.

It is even more difficult to make the counts identical, and to maintain the situation. Specifically, since the phases of the clock signals to be synchronized differ, even if the clock signals are completely the same frequency, it is possible for the counts to have a difference which is admittedly constant, but nevertheless has an interfering effect.

If necessary, the count adaptation unit 540 modifies the signal $\Delta f_{filter}$ which is input to it and is optimized or is in any case suitable for clock signal synchronization, and uses this as the basis to produce the signal $\Delta f_{VCXO}$ which is input to the clock signal generator block 550 and which, as has already been mentioned above, represents a measure of the desired error between the frequency of the clock signal produced by the clock signal generator 552 and the known nominal frequency of the clock signal in the data transmitting station. To be more precise, the count adaptation unit is used to produce a signal $\Delta f_{VCXO}$ using (if the counts have a difference which is not the same as the nominal difference) the clock signal generator is triggered in such a manner that the clock signal produced by it is at a frequency which differs from the frequency of the first clock signal until the counts reach the desired nominal difference.

The signal $\Delta f_{VCXO}$ that is produced by the count adaptation unit 540 and is modified from $\Delta f_{filter}$ if count differences exist (ets–dts≠0) is calculated using $$\Delta f_{VCXO,n} = sat\left(\Delta f_{filter,n} + \frac{ets_n - dts_n}{T}\right) \quad (106)$$

where $$sat(x) = \begin{cases} F & \text{if } x > F \\ x & \text{if } |x| \le F \\ -F & \text{if } c < -F \end{cases} \quad (107)$$

and where $ets_n$–$dts_n$ is the difference ets–dts relating to an n-th time stamp, T is an upper limit of the time interval between the times of reception of two successive ets values, and F is a constant such as the maximum possible (permissible) error between the frequency of the clock signal in the data transmitting station and its nominal frequency.

The count adaptation carried out in this way is advantageous to the extent that, in contrast to the situation in which, for example, a count is overwritten for an intermediate stop or for temporarily counting in different steps, no count is output or can appear more than once. At the same time, fixing the constants at the values or similar values results, on the one hand, in it being possible for any undamped oscillations to occur in the count difference while, on the other hand, no significant interference is caused to the clock signal synchronization.

In summary, with regard to the second exemplary embodiment, it may be stated that in this manner (estimated) control parameters determined in this way are also highly suitable for qualitatively extremely high-quality synchronization (if necessary particularly quickly, and otherwise very accurately and without susceptibility to interference) of one clock signal with another clock signal and, in consequence, make it possible relatively easily to overcome the disadvantages associated with known synchronization methods.

I claim:

1. An improved method for synchronization of a first clock signal generated in a data receiving station with a second clock signal used in a data transmitting station, the improvement which comprises:

transmitting timemark data representing a count dependent on a frequency of the second clock signal from the data transmitting station to the data receiving station;

evaluating a value and a time of reception of the timemark data in the data receiving station;

forming in the data receiving station estimated values based on both current timemark data and previously received timemark data and the estimated values representing a parameter characterizing the frequency of the second clock signal of the data transmitting station by minimizing a sum of the squares of values, the values characterizing differences between the timemark data of the data transmitting station and relationships calculated using the estimated values; and triggering a clock signal generator to produce the first clock signal to be synchronized to the second clock signal on a basis of the estimated values.

2. The method according to claim 1, which comprises including the squares of the values characterizing the differences in a sum formation with different weightings.

3. The method according to claim 2, which comprises decreasing the weightings as the differences characterizing the values become older.

4. An improved method for synchronization of a first clock signal generated in a data receiving station with a second clock signal used in a data transmitting station, the improvement which comprises:

transmitting timemark data representing a count dependent on a frequency of the second clock signal from the data transmitting station to the data receiving station;

evaluating a value and a time of reception of the timemark data in the data receiving station;

forming in the data receiving station estimated values based on both current timemark data and previously received timemark data and the estimated values representing a parameter characterizing the frequency of the second clock signal of the data transmitting station;

forming a calculated parameter by a calculation based on the current timemark data of the parameter characterizing the frequency of the second clock signal, and filtering the calculated parameter using an adaptive filter for forming the estimated values; and triggering a clock signal generator to produce the first clock signal to be synchronized to the second clock signal on a basis of the estimated values.

5. The method according to claim 4, which comprises forming an output signal of the adaptive filter in dependence on at least the calculated parameter and a respective preceding output signal from the adaptive filter.

6. The method according to claim 4, which comprises forming an output signal of the adaptive filter in dependence on a weighting factor having a magnitude varied with respect to time such that an influence of the calculated parameter is initially relatively large after one of a start and reset of the data transmitting station and the data receiving station and the magnitude decreasing further and further as time passes.

7. The method according to claim 6, which comprises limiting the magnitude of the weighting factor that varies as a function of time such that the influence of the calculated parameter on the output signal of the adaptive filter is greater than or equal to a specific minimum level.

8. An improved method for synchronization of a first clock signal generated in a data receiving station with a second clock signal used in a data transmitting station, the improvement which comprises:

transmitting timemark data representing a count dependent on a frequency of the second clock signal from the data transmitting station to the data receiving station;

evaluating a value and a time of reception of the timemark data in the data receiving station;

forming in the data receiving station estimated values based on both current timemark data and previously received timemark data and the estimated values representing a parameter characterizing the frequency of the second clock signal of the data transmitting station;

using an algorithm allowing recursive estimated value determinations for at least partially determining the estimated values; and triggering a clock signal generator to produce the first clock signal to be synchronized to the second clock signal on a basis of the estimated values.

* * * * *